US012183995B2

(12) United States Patent
Cheng et al.

(10) Patent No.: US 12,183,995 B2
(45) Date of Patent: Dec. 31, 2024

(54) ANTENNA STRUCTURE AND ELECTRONIC APPARATUS

(71) Applicants: Ta-Hong Cheng, Taipei (TW); Yen-Hao Yu, Taipei (TW); Shih-Chia Liu, Taipei (TW); Po-Hsuan Chen, Taipei (TW); Jui-Hung Lai, Taipei (TW)

(72) Inventors: Ta-Hong Cheng, Taipei (TW); Yen-Hao Yu, Taipei (TW); Shih-Chia Liu, Taipei (TW); Po-Hsuan Chen, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 203 days.

(21) Appl. No.: 17/959,303

(22) Filed: Oct. 4, 2022

(65) Prior Publication Data

US 2023/0118456 A1 Apr. 20, 2023

Related U.S. Application Data

(60) Provisional application No. 63/257,562, filed on Oct. 19, 2021.

(51) Int. Cl.
*H01Q 9/04* (2006.01)
*H01Q 1/48* (2006.01)
*H01Q 17/00* (2006.01)

(52) U.S. Cl.
CPC ............. *H01Q 9/0407* (2013.01); *H01Q 1/48* (2013.01); *H01Q 17/00* (2013.01)

(58) Field of Classification Search
None
See application file for complete search history.

(56) References Cited

U.S. PATENT DOCUMENTS

| | | | | |
|---|---|---|---|---|
| 5,461,393 | A * | 10/1995 | Gordon | H01Q 9/0442 343/769 |
| 6,329,959 | B1 * | 12/2001 | Varadan | H01Q 1/364 343/700 MS |
| 6,388,626 | B1 * | 5/2002 | Gamalielsson | H01Q 5/40 343/702 |
| 2013/0057442 | A1 * | 3/2013 | Brown | H01Q 21/24 343/750 |
| 2016/0013557 | A1 * | 1/2016 | Kawaguchi | H01Q 21/08 343/904 |
| 2018/0076376 | A1 * | 3/2018 | Brady | H10N 10/855 |
| 2018/0358699 | A1 * | 12/2018 | Li | H01Q 9/42 |
| 2020/0144710 | A1 * | 5/2020 | Ndip | H01Q 9/0407 |

* cited by examiner

*Primary Examiner* — Wilson Lee
(74) *Attorney, Agent, or Firm* — JCIPRNET

(57) ABSTRACT

An antenna structure and an electronic apparatus are provided. The antenna structure includes a substrate, a first radiation part, and a second radiation part. The substrate has a first surface and a second surface opposite to each other. The first radiation part is disposed on the first surface. The first radiation part is an absorber material. The second radiation part is disposed on the second surface. The second radiation part is coupled to a feeding part. There is a distance between the second radiation part and the first radiation part, so as to excite a first resonance mode through the coupling of the second radiation part to the first radiation part. Accordingly, the specific absorption rate (SAR) value of the electromagnetic wave is reduced.

19 Claims, 9 Drawing Sheets

ANTENNA STRUCTURE AND ELECTRONIC APPARATUS

CROSS-REFERENCE TO RELATED APPLICATION

This application claims the priority benefits of U.S. provisional application Ser. No. 63/257,562, filed on Oct. 19, 2021. The entirety of the above-mentioned patent application is hereby incorporated by reference herein and made a part of specification.

BACKGROUND

Technical Field

The disclosure relates to an antenna, and more particularly, to an antenna structure and an electronic apparatus.

Description of Related Art

Electromagnetic waves generated by radio products may affect human health. Therefore, many countries have formulated regulations for such products. The specific absorption rate (SAR) of the electromagnetic wave is an index used to evaluate the absorption of electromagnetic radiation by the human body. Under the action of the external electromagnetic field, the induced electromagnetic field generated in the human body will generate electric current and cause absorption and dissipation of electromagnetic energy. The SAR can be used to represent such physical processes. It can be seen that the antenna of the radio product needs to be designed for SAR in order to comply with the regulations.

SUMMARY

An embodiment of the disclosure provides an antenna structure and an electronic apparatus, which can reduce the SAR value by disposing a radiator with an absorber material.

The antenna structure of the embodiment of the disclosure includes (but is not limited to) a substrate, a first radiation part, and a second radiation part. The substrate has a first surface and a second surface opposite to each other. The first radiation part is disposed on the first surface. The first radiation part is an absorber material. The second radiation part is disposed on the second surface. The second radiation part is coupled to a feeding part. There is a distance between the second radiation part and the first radiation part, so as to excite a first resonance mode through the coupling of the second radiation part to the first radiation part.

The electronic apparatus of the embodiment of the disclosure includes (but is not limited to) the above-mentioned antenna structure.

Based on the above, according to the antenna structure and the electronic apparatus of the embodiment of the disclosure, the radiation parts are respectively provided on two opposite sides of the substrate, and one of the radiation parts is composed of the absorber material. In addition, a specific resonance mode is excited in the radiation part of the absorber material through a coupling method. Accordingly, the SAR value is effectively reduced.

In order to make the above-mentioned and other features and advantages of the disclosure easier to understand, the following embodiments are given and described in detail with the accompanying drawings as follows.

DESCRIPTION OF THE EMBODIMENTS

Figure 1A:
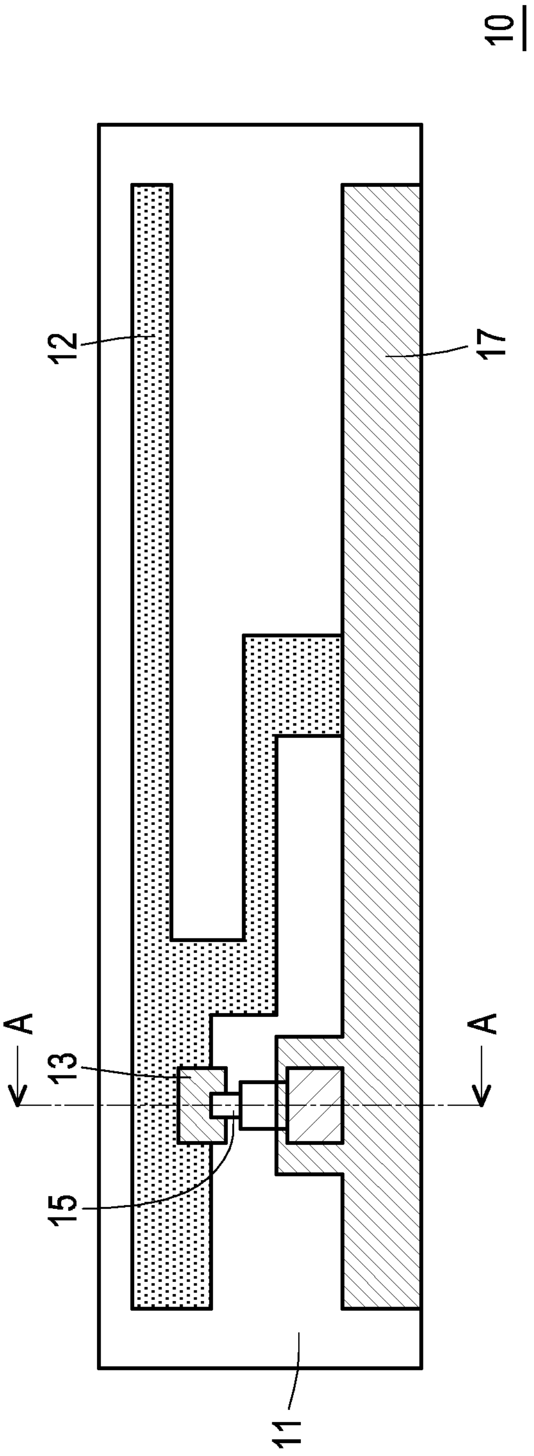
FIG. 1A is a perspective view of an antenna structure according to the first embodiment of the disclosure.
Figure 1B:
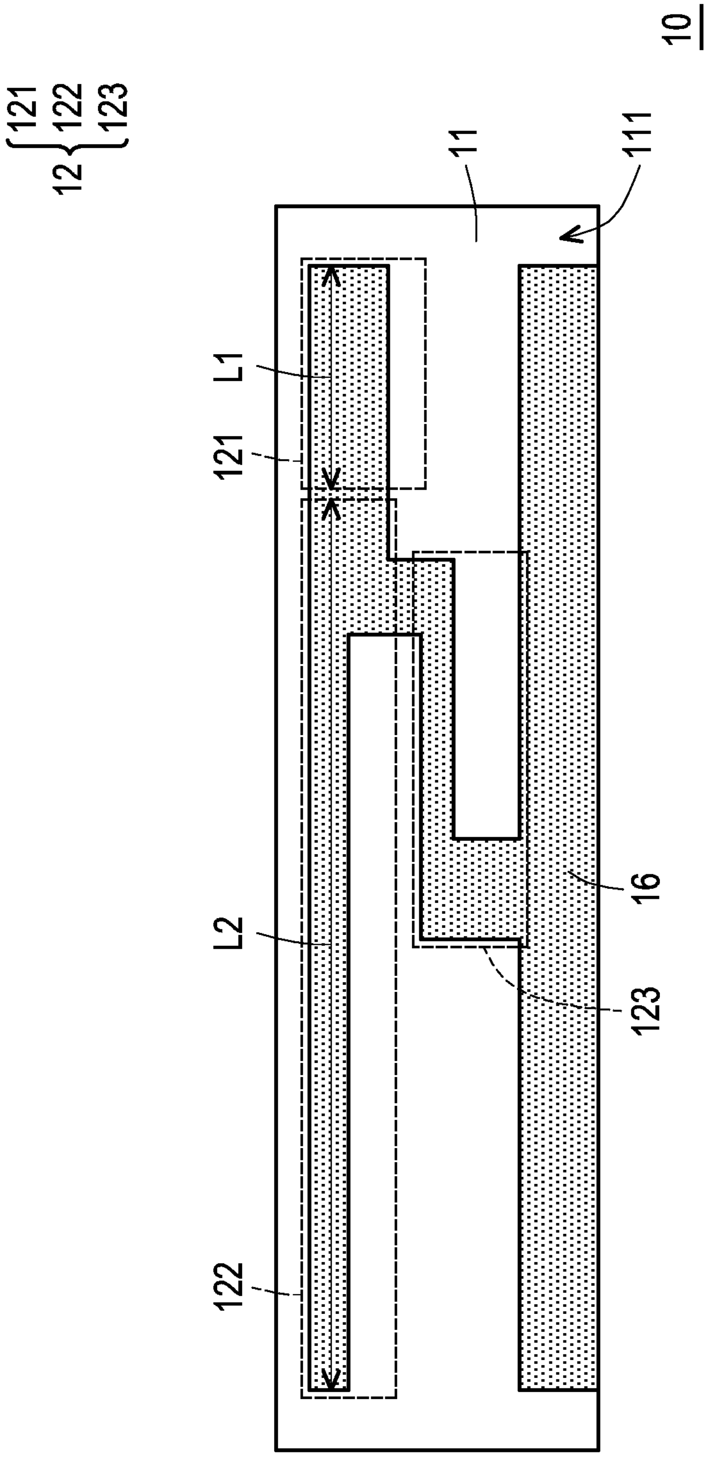
FIG. 1B is a schematic view of an antenna structure according to the first embodiment of the disclosure.

FIG. 1A is a perspective view of an antenna structure 10 according to the first embodiment of the disclosure. FIG. 1B is a schematic view of an antenna structure 10 according to the first embodiment of the disclosure, and FIG. 1C is a schematic view of an antenna structure 10 according to the first embodiment of the disclosure viewed from another viewing angle.

Figure 1C:
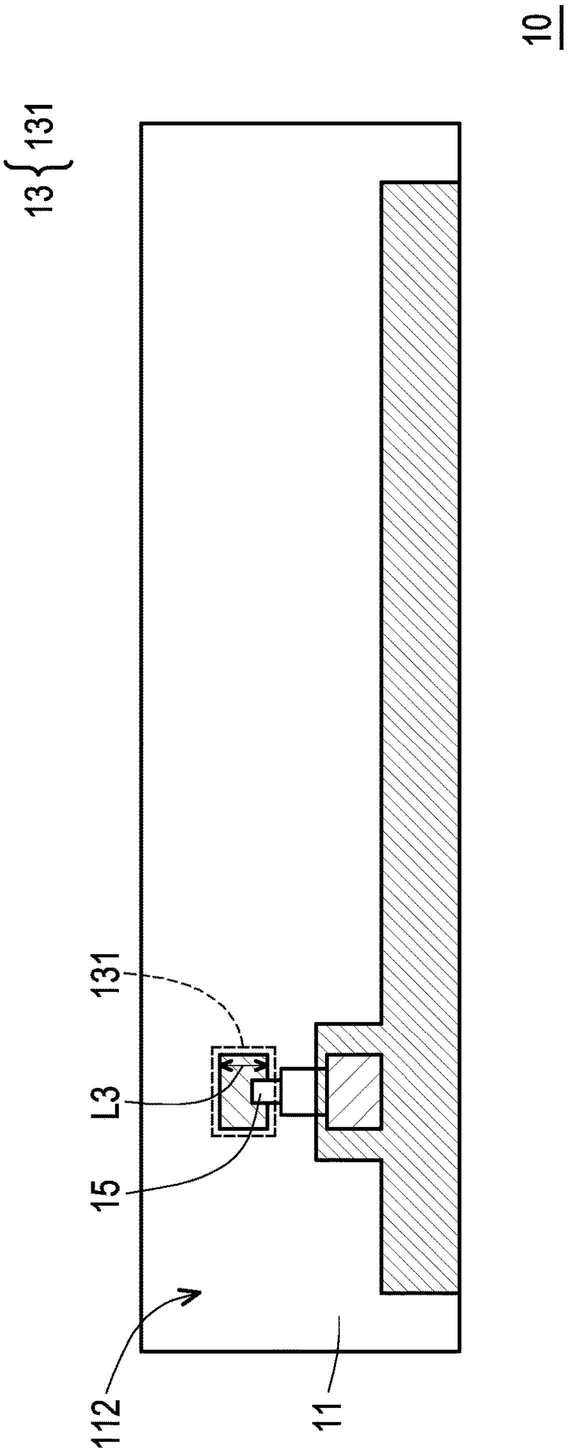
FIG. 1C is a schematic view of an antenna structure according to the first embodiment of the disclosure viewed from another viewing angle.

Referring to FIGS. 1A to 1C, the antenna structure 10 includes (but is not limited to) a substrate 11, a first radiation part 12, a second radiation part 13, a feeding part 15 and grounding parts 16 and 17.

The substrate 11 may be a printed circuit substrate, a plastic board, or other carriers, and the types of the substrate are not limited in the embodiment of the disclosure. The substrate 11 has a first surface 111 (as shown in FIG. 1B) and a second surface 112 (as shown in FIG. 1C) opposite to each other.

Figure 1D:
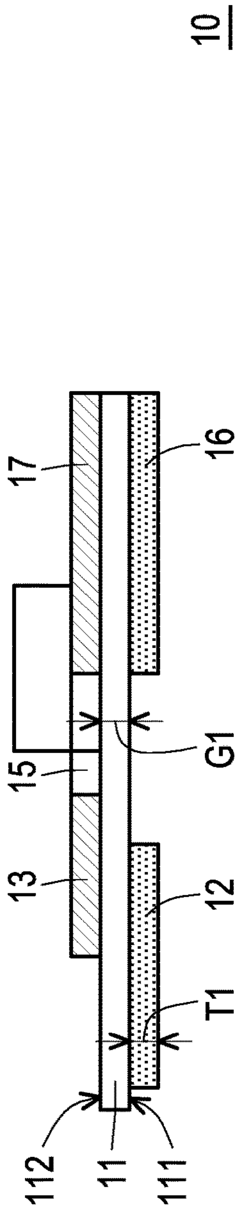
FIG. 1D is a cross-sectional view of FIG. 1A along a section line A-A.

FIG. 1D is a cross-sectional view of FIG. 1A along a section line A-A. Referring to FIG. 1D, in an embodiment, the first surface 111 is parallel to the second surface 112. That is, the substrate 11 is in the shape of a flat plate. Here, "opposite" means that the orientation of the first surface 111 is opposite to the orientation of the second surface 112. In an embodiment, the thickness of the substrate 11 (i.e., a distance G1 (minimum distance) between the first radiation part 12 and the second radiation part 13) is less than 0.4 millimeters (mm). It should be noted that, according to different application requirements, in other embodiments, the first surface 111 and the second surface 112 may be curved surfaces, irregular surfaces, or surfaces of other shapes.

Referring to FIGS. 1B and 1D, the first radiation part 12 is disposed on the first surface 111. The first radiation part 12 is an absorber material. The absorber material can be composed of a resistive, a dielectric, or a magnetic dielectric material. In an embodiment, a thickness T1 of the first radiation part 12 as shown in FIG. 1D is less than 0.2 mm. In addition, the permeability of the absorber material is about 100 to 200.

Referring to FIGS. 1C and 1D, the second radiation part 13 is disposed on the second surface 112. In an embodiment, the second radiation part 13 is a metal material, for example, a copper foil, or other metal conductors. The hatched portion shown in the figure indicates the metal material, and the dotted portion indicates the absorber material. In addition, the second radiation part 13 is coupled to the feeding part 15.

Referring to FIG. 1D, the second radiation part 13 and the first radiation part 12 are separated by the distance G1 because of the substrate 11 interposed between the second radiation part 13 and the first radiation part 12. Therefore, the RF/microwave signal from the feeding part 15 is coupled to the first radiation part 12 through the second radiation part 13 to excite a first resonance mode (e.g., 5.15 to 5.8 GHz) and a second resonance mode (e.g., 2.4 to 2.5 GHz).

Referring to FIG. 1D, in an embodiment, the orthographic projection of the first radiation part 12 on the substrate 11 partially overlaps the orthographic projection of the second radiation part 13 on the substrate 11. The overlapping part of the two radiation parts 12 and 13 accounts for approximately 30 to 50% of the area of the second radiation part 13, but is not limited thereto.

In other embodiments, a part of the first radiation part 12 may also overlap with the second radiation part 13 on other projection surfaces, so that the signal can be coupled to the first radiation part 12 through the second radiation part 13 to generate the first resonance mode and the second resonance mode.

There are many variations in the shape of the first radiation part 12. Referring to FIG. 1A and FIG. 1B, in an embodiment, the first radiation part 12 includes a first branch 121 and a second branch 122. The first branch 121 extends to the right of FIG. 1B, and the second branch 122 extends to the left of FIG. 1B. The first branch 121 is used to excite the first resonance mode. In addition, the RF/microwave signal from the feeding part 15 excites the second resonance mode (e.g. 2.4 to 2.5 GHz) through the second branch 122.

In an embodiment, a length L1 of the first branch 121 is about ¼ wavelength of the first resonance mode which is, for example, 10 to 15 mm. A length L2 of the second branch 122 is about ¼ wavelength of the second resonance mode which is, for example, 25 to 30 mm.

In an embodiment, the first radiation part 12 includes a first short-circuit part 123. The first short-circuit part 123 is coupled to the second branch 122 and the grounding part 16, but may be coupled to the first branch 121 in other embodiments.

In an embodiment, the size of the first branch 121, the second branch 122, and the first short-circuit part 123 are related to the impedance matching of the antenna structure 10. That is, the impedance matching is achieved by adjusting the size of the first branch 121, the second branch 122, and/or the first short-circuit part 123.

There are also many variations in the shape of the second radiation part 13. Referring to FIGS. 1A and 1C, the second radiation part 13 includes a first section 131. The first section 131 is coupled to the feeding part 15. In addition, a length L3 of the first section 131 is less than ¼ wavelength of the first resonance mode which is, for example, 10 to 15 mm.

In an embodiment, the width of the second radiation part 13 is related to the impedance matching of the first resonance mode and the second resonance mode. That is, the impedance matching of the first resonance mode (for example, corresponding to the high frequency band of 5.5 GHz) and the second resonance mode (for example, corresponding to the low frequency band of 2.4 to 2.5 GHz) may be achieved by adjusting the size of the second radiation part 13.

The grounding part 16 is coupled to the grounding part 17. The grounding part 17 may further connect to the grounding part of the system (e.g., the antenna structure 10 or the circuit or apparatus in which the antenna structure 10 is disposed). However, in other embodiments, the grounding part 16 may not be directly connected to the grounding part of the system.

It should be noted that, according to different design requirements (e.g., frequency or impedance of the resonance mode), the shape and size of the first radiation part 12 and the second radiation part 13 may also have other variations.

Figure 2A:
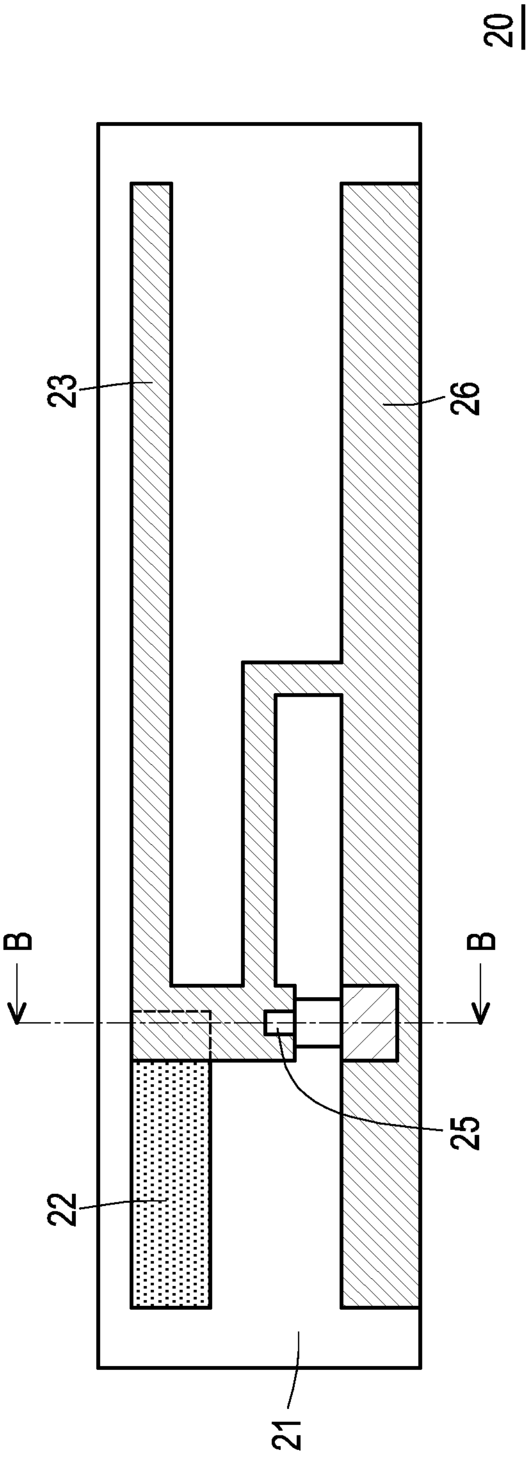
FIG. 2A is a perspective view of an antenna structure according to the second embodiment of the disclosure.
Figure 2B:
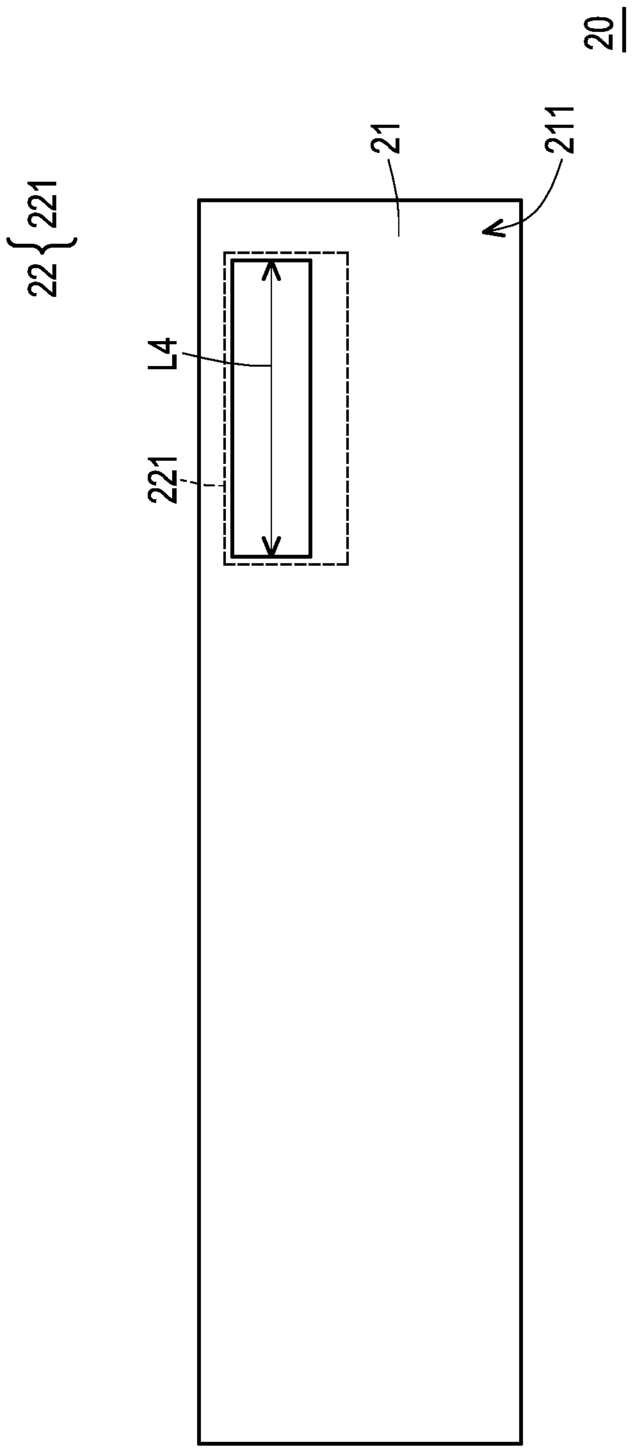
FIG. 2B is a schematic view of an antenna structure according to the second embodiment of the disclosure.
Figure 2C:
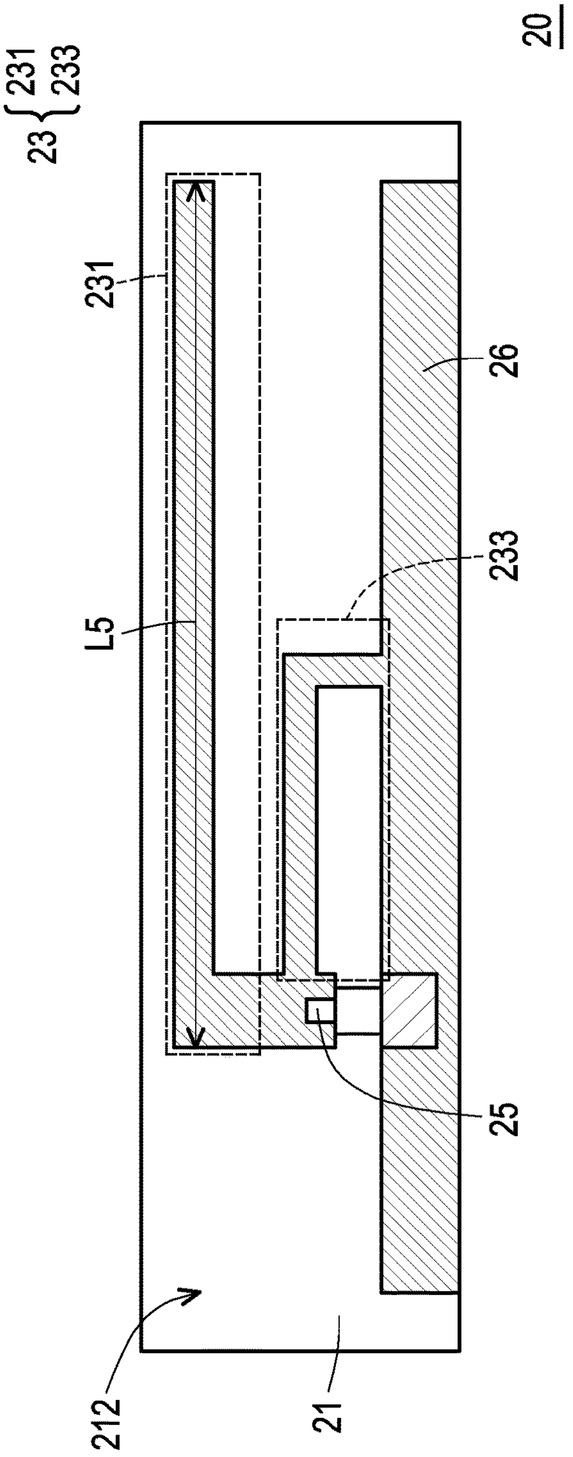
FIG. 2C is a schematic view of an antenna structure according to the second embodiment of the disclosure viewed from another viewing angle.

FIG. 2A is a perspective view of an antenna structure 20 according to the second embodiment of the disclosure, FIG. 2B is a schematic view of an antenna structure 20 according to the second embodiment of the disclosure, and FIG. 2C is a schematic view of an antenna structure 20 according to the second embodiment of the disclosure viewed from another viewing angle. Referring to FIGS. 2A to 2C, the antenna structure 20 includes (but is not limited to) a substrate 21, a first radiation part 22, a second radiation part 23, a feeding part 25, and a grounding part 26.

Figure 2D:
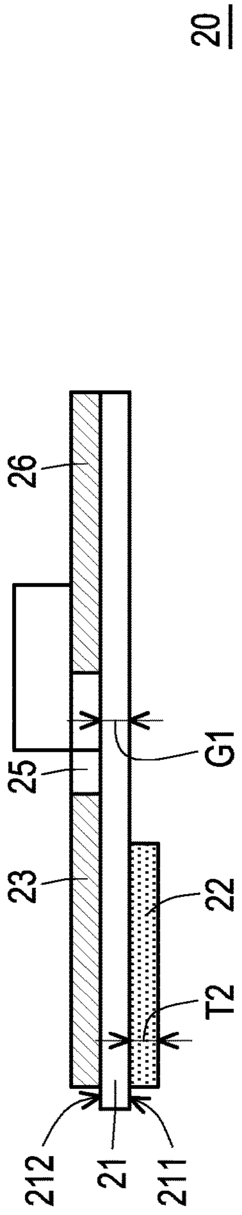
FIG. 2D is a cross-sectional view of FIG. 2A along a section line B-B.

FIG. 2D is a cross-sectional view of FIG. 2A along a section line B-B. Referring to FIG. 2D, the substrate 21 has a first surface 211 (as shown in FIG. 2B) and a second surface 212 (as shown in FIG. 2C) opposite to each other. In an embodiment, the thickness of the substrate 21 (i.e. a distance G2 (minimum distance) between the first radiation part 22 and the second radiation part 23) is less than 0.4 mm.

Referring to FIGS. 2B and 2D, the first radiation part 22 is disposed on the first surface 211. The first radiation part 22 is an absorber material. In an embodiment, a thickness T2 of the first radiation part 22 as shown in FIG. 2D is less than 0.2 mm.

Referring to FIGS. 2C and 2D, the second radiation part 23 is disposed on the second surface 212, and the second radiation part 23 is coupled to the feeding part 25. In an embodiment, the second radiation part 23 is a metal material.

Referring to FIG. 2D, the RF/microwave signal from the feeding part 25 can be coupled to the first radiation part 22 through the second radiation part 23 to excite the first resonance mode.

For other descriptions of the substrate 21, the first radiation part 22, the second radiation part 23, the feeding part 25, and the grounding part 26, please refer to the substrate 11, the first radiation part 12, the second radiation part 13, the feeding part 15, and the grounding part 16 of the first embodiment respectively, and descriptions are not repeated here.

The difference from the first embodiment is that the antenna structure 20 excites the first resonance mode through a first radiator 22, but excites the second resonance mode through the second radiation part 23.

Referring to FIGS. 2A and 2B, the first radiation part 22 includes a second section 221. The second section 221 extends to the right of FIG. 2B. The length of the second section 221 is about ¼ wavelength of the first resonance mode which is, for example, 10 to 15 mm.

In an embodiment, the width of the second section 221 is related to the impedance matching of the first resonance mode. That is, the impedance matching of the first resonance mode (e.g., corresponding to the high frequency band of 5.5 GHz) may be achieved by adjusting the size of the second section 221.

Referring to FIGS. 2A and 2C, the second radiation part 23 includes a third branch 231. The third branch 231 extends to the right of the figure. A length L5 of the third branch 231 is about ¼ wavelength of the second resonance mode which is, for example, 25 to 30 mm. The RF/microwave signal from the feeding part 25 excites the second resonance mode through the third branch 231.

In an embodiment, the second radiation part 23 includes a second short-circuit part 233. The second short-circuit part 233 is coupled to the third branch 231 and the grounding part 26.

In an embodiment, the size of the second short-circuit part 233 is related to the impedance matching of the first resonance mode and the second resonance mode. That is, the impedance matching of the first resonance mode and/or the second resonance mode may be achieved by adjusting the size of the second short-circuit part 233.

It should be noted that, according to different design requirements, the shape and size of the first radiation part 22 and the second radiation part 23 may also have other variations.

The antenna structures 10 and 20 of the first embodiment or the second embodiment can be provided in an electronic apparatus (e.g., a notebook computer, a smart phone, a wearable apparatus, a head-mounted apparatus, a handheld apparatus, or a radio apparatus).

Figure 3A:
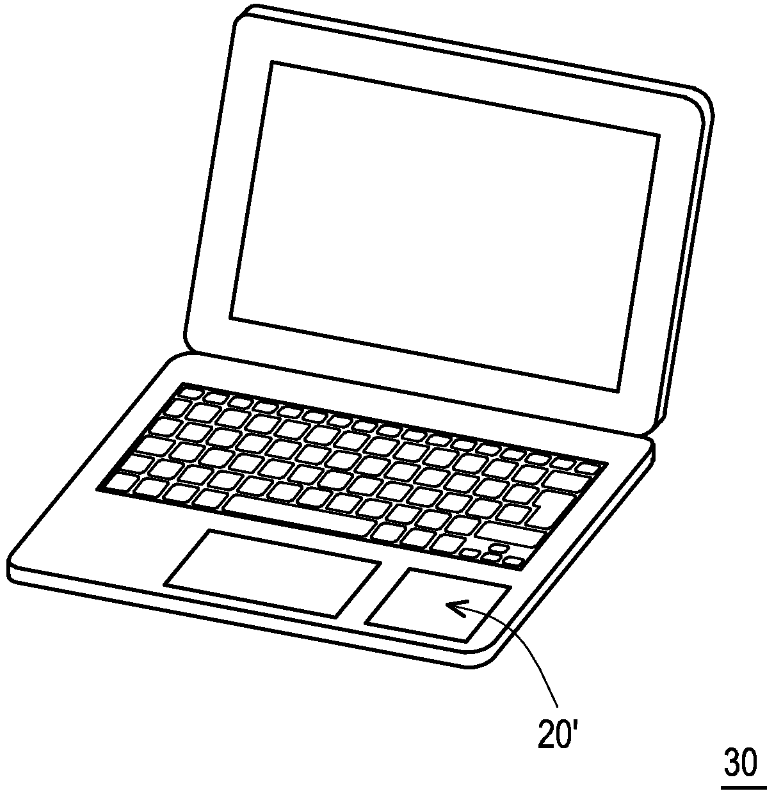
FIG. 3A is a schematic view of an electronic apparatus according to an embodiment of the disclosure.

For example, FIG. 3A is a schematic view of an electronic apparatus 30 according to an embodiment of the disclosure. Referring to FIG. 3A, the electronic apparatus 30 (taking a notebook computer as an example) includes an antenna structure 20'. The antenna structure 20' corresponds to the antenna structure 20 of the second embodiment. The embodiment takes the second embodiment as an example, but the antenna structure 20' can also be replaced by the antenna structure 10 of the first embodiment.

Figure 3B:
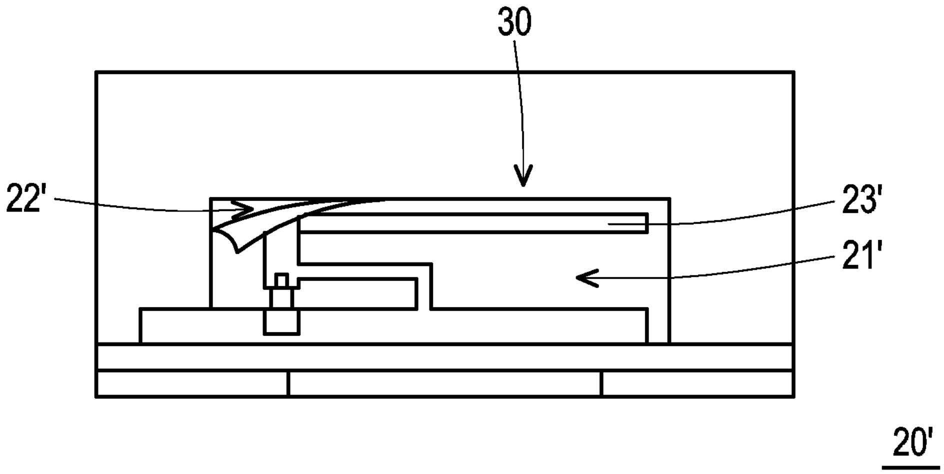
FIG. 3B and FIG. 3C are schematic views of an arrangement of an antenna structure according to an embodiment of the disclosure.
Figure 3C:
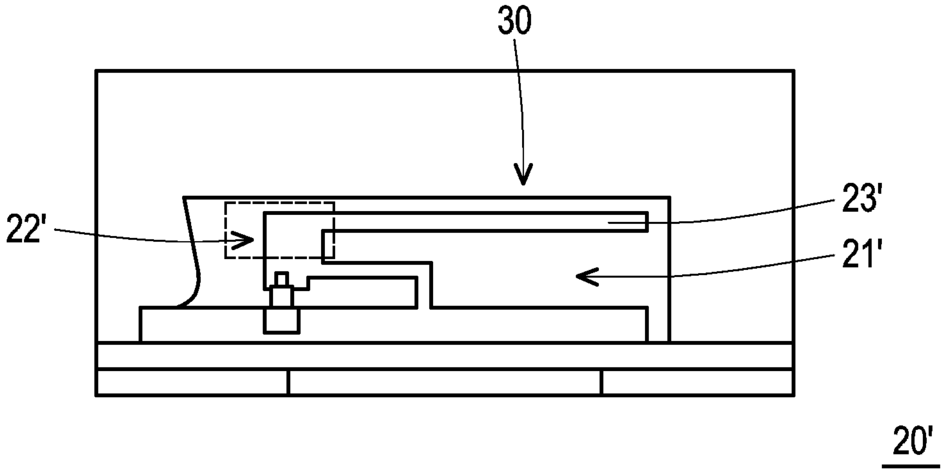

FIG. 3B and FIG. 3C are schematic views of an arrangement of the antenna structure 20' according to an embodiment of the disclosure. Referring to FIG. 3B and FIG. 3C, a schematic view of the electronic apparatus 30 after the casing is disassembled is provided. For descriptions of a substrate 21', a first radiator 22', and a second radiator 23', please refer to the descriptions of the substrate 21, the first radiator 22 and the second radiator 23 respectively, and the descriptions are not repeated here. After the substrate 21' is slightly lifted/bent from the upper left corner (as shown in FIG. 3B), the first radiator 22' disposed on the other side can be seen. That is, under normal conditions (the substrate 21' is not lifted/bent), the substrate 21' completely covers the first radiator 22' from the viewing angle of FIG. 3C.

According to different design requirements, the antenna structure 20' may also be disposed at other positions of the electronic apparatus 30.

In practical applications, the first surfaces 111 and 211 of the first embodiment and the second embodiment can be disposed on the side of the body of the electronic apparatus 30 facing the human body, and the second surfaces 112 and 212 can be disposed on the side of the body of the electronic apparatus 30 facing away from the human body. Accordingly, the electromagnetic wave generated from the antenna structures 10, 20, and 20' may be affected by the absorber material, so that the impact on the human body may be reduced.

Figure 4:
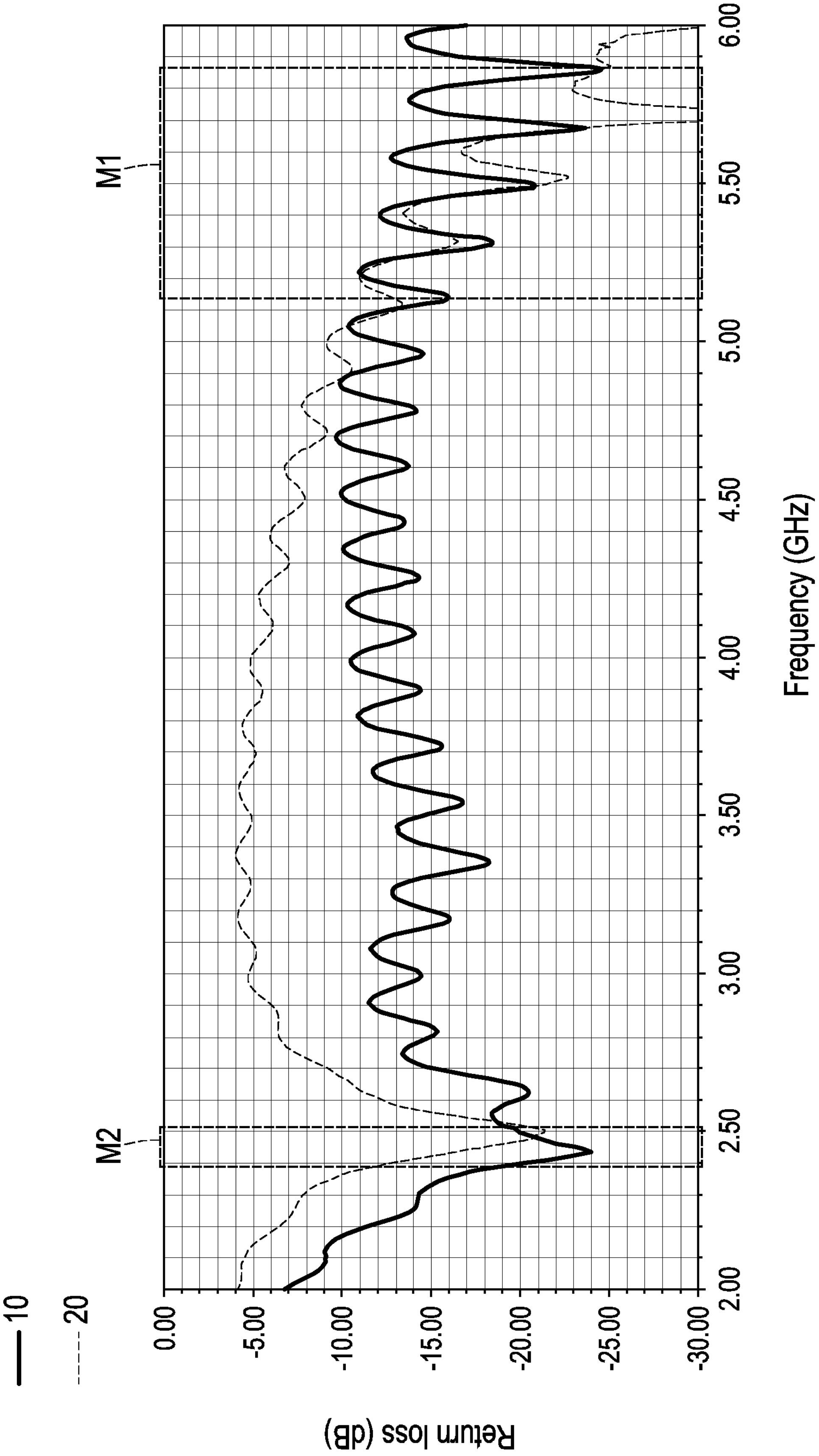
FIG. 4 is a return loss view of antenna structures according to the first and second embodiments of the disclosure.

FIG. 4 is a return loss view of the antenna structures 10 and 20 according to the first and second embodiments of the disclosure. Referring to FIG. 4, both the antenna structures 10 and 20 excites a first resonance mode M1 (e.g. 5.2 to 5.8 GHz) and a second resonance mode M2 (e.g. 2.4 to 2.5 GHz).

Table (1) is the SAR experimental results for the first embodiment, the second embodiment, and a typical antenna structure (which uses the same pattern as FIG. 1A and FIG. 2A without using the absorber material):

TABLE 1

| | SAR(w/1 g) for the first embodiment | SAR(w/1 g) for the second embodiment | SAR(w/1 g) for a typical antenna structure |
|---|---|---|---|
| 2.412 GHz | 1.66 | 1.87 | 1.94 |
| 2.442 GHz | 1.71 | 1.87 | 1.90 |
| 2.472 GHZ | 1.76 | 1.91 | 1.95 |
| 5.2 GHZ | 2.43 | 2.21 | 4.16 |
| 5.32 GHZ | 2.75 | 2.42 | 4.39 |
| 5.6 GHZ | 2.55 | 2.41 | 4.68 |
| 5.825 GHZ | 2.61 | 2.60 | 4.67 |

When operating at different frequencies in the first resonance mode (e.g., 5.2 to 5.825 GHz), the SAR values of the first and second embodiments are significantly lower than the SAR values of the typical antenna structure.

To sum up, in the antenna structure and the electronic apparatus of the embodiment of the disclosure, the first radiation part made of the absorber material is provided, and the second radiation part coupled to the feeding part is coupled to the first radiation part to generate the first resonance mode. Accordingly, the SAR value of the frequency band corresponding to the first resonance mode may be reduced thereby. Since the SAR can be effectively reduced, the front end of the RF module can use a higher output power, thereby ensuring the quality of signal transmission and improving the user experience.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. An antenna structure, comprising:
- a substrate, having a first surface and a second surface opposite to each other;
- a first radiation part, disposed on the first surface, wherein the first radiation part is an absorber material; and
- a second radiation part, disposed on the second surface and coupled to a feeding part, wherein
- an orthographic projection of the first radiation part on the substrate partially overlaps an orthographic projection of the second radiation part on the substrate,
- there is a distance between the second radiation part and the first radiation part, so as to excite a first resonance mode through coupling of the second radiation part to the first radiation part.

2. The antenna structure according to claim 1, further exciting a second resonance mode through the coupling of the second radiation part to the first radiation part.

3. The antenna structure according to claim 2, wherein the first radiation part comprises:
- a first branch for exciting the first resonance mode; and
- a second branch for exciting the second resonance mode.

4. The antenna structure according to claim 3, wherein a length of the first branch is about ¼ wavelength of the first resonance mode.

5. The antenna structure according to claim 3, wherein a length of the second branch is about ¼ wavelength of the second resonance mode.

6. The antenna structure according to claim 3, wherein the first radiation part further comprises:

a first short-circuit part, coupled to one of the first branch and the second branch, and a grounding part.

7. The antenna structure according to claim 6, wherein a size of the first branch, the second branch, and the first short-circuit part is related to an impedance matching.

8. The antenna structure according to claim 2, wherein the second radiation part comprises:

a first section, coupled to the feeding part, with a length of less than ¼ wavelength of the first resonance mode.

9. The antenna structure according to claim 6, wherein a width of the first section is related to an impedance matching of the first resonance mode.

10. The antenna structure according to claim 1, further exciting a second resonance mode through the second radiation part.

11. The antenna structure according to claim 10, wherein the second radiation part comprises a third branch for exciting the second resonance mode.

12. The antenna structure according to claim 11, wherein a length of the third branch is about ¼ wavelength of the second resonance mode.

13. The antenna structure according to claim 11, wherein the second radiation part further comprises:

a second short-circuit part, coupled to a grounding part.

14. The antenna structure according to claim 13, wherein a size of the second short-circuit part is related to an impedance matching of the first resonance mode and the second resonance mode.

15. The antenna structure according to claim 10, wherein the first radiation part comprises:

a second section, with a length of approximately ¼ wavelength of the first resonance mode.

16. The antenna structure according to claim 15, wherein a width of the second section is related to an impedance matching of the first resonance mode.

17. The antenna structure according to claim 1, wherein the second radiation part is a metal material.

18. The antenna structure according to claim 1, wherein the distance is less than 0.4 mm.

19. An electronic apparatus, comprising the antenna structure according to claim 1.

* * * * *